Dec. 1, 1931.  M. J. ROTHROCK  1,834,348

THERMOSTAT DRAFT CONTROL

Filed April 14, 1930   2 Sheets-Sheet 1

Moses J. Rothrock
INVENTOR

BY
ATTORNEY

Dec. 1, 1931.  M. J. ROTHROCK  1,834,348
THERMOSTAT DRAFT CONTROL
Filed April 14, 1930   2 Sheets-Sheet 2

Moses J. Rothrock
INVENTOR

BY
ATTORNEY

Patented Dec. 1, 1931

1,834,348

UNITED STATES PATENT OFFICE

MOSES J. ROTHROCK, OF PORTLAND, OREGON

THERMOSTAT DRAFT CONTROL

Application filed April 14, 1930. Serial No. 444,167.

My invention is intended for use in the regulating of drafts and may be used successfully for the controlling of heat in chicken brooders, in incubators, or in any and all places where it is desired to regulate the amount of warmed air, or any air, entering a chamber in which a thermostat regulator is disposed.

The invention in its preferred embodiment consists of a damper element depending from a bar disposed horizontally within the air transfer well with means for actuating the pendulum bar through thermostatic means for predetermining the amount of opening disposed within the dual passaged air transfer well, to thereby regulate the amount of warmed air entering the chamber in which the heat is to be regulated. Manually manipulative means are provided for regulating the temperature at which the thermostat is to be actuated and for also predetermining the amount of movement of the damper element relative to the thermostat elements.

The primary object of my invention is to regulate the temperature within a given compartment.

A further object of my invention is to predetermine the amount of cool and warm air that is to be admitted into the compartment in which the temperature is to be regulated.

A further object of my invention consists in providing a simple and efficient means for the regulating of temperatures of different degrees in more than one compartment where the primary heat for each of the compartments is derived from a single source.

A still further object of my invention consists in providing a device for use in brooder or colony houses to regulate the temperature in the different brooders, or colony houses automatically at different temperatures, even though the source if heat is a constant temperature.

A still further object of my invention consists in providing an efficient device for the regulating of different temperatures in colony and brooder houses and at the same time to supply the same with a supply of normal air and to circulate the same within the colony and brooder houses.

A further object of my invention consists in providing simple means that are economical in first cost, that may be cheaply built, and that will operate over relatively long periods with a minimum of alteration, adjustment and repair.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings.

Like reference characters refer to like parts throughout the several views.

Figure 1:
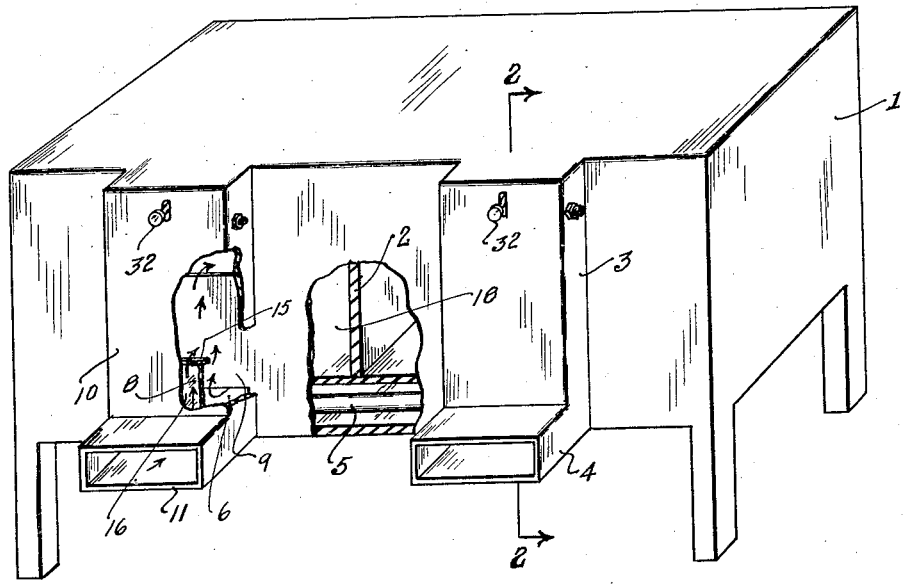
Fig. 1 is a perspective, front view, partially in section, of the assembled device.
Figure 5:
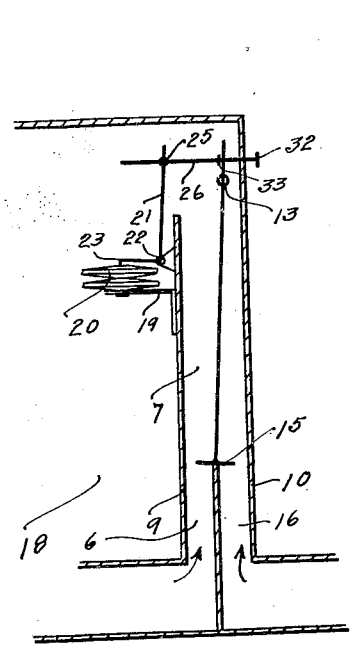
Fig. 5 is a diagrammatical layout of the air transfer well, the thermostat bar, and the damper element and illustrating the damper element in position for the admittance of air of different temperatures into the air transfer well.
Figure 6:
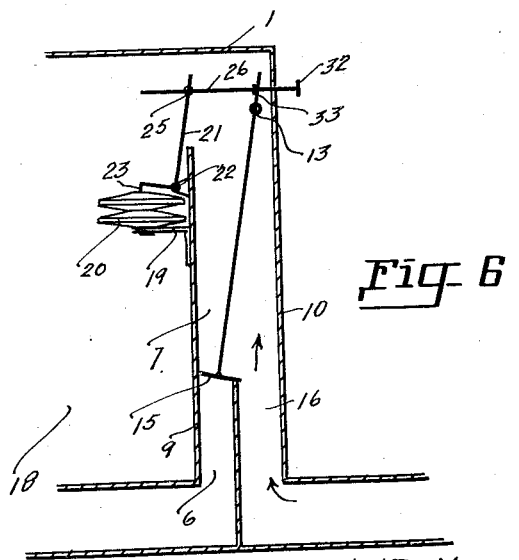
Fig. 6 is a diagrammatical layout, in side elevation, of the mechanism illustrated in Fig. 5, the same being illustrated in position for admitting air of one temperature only into the air transfer well.
Figures 2, 3:
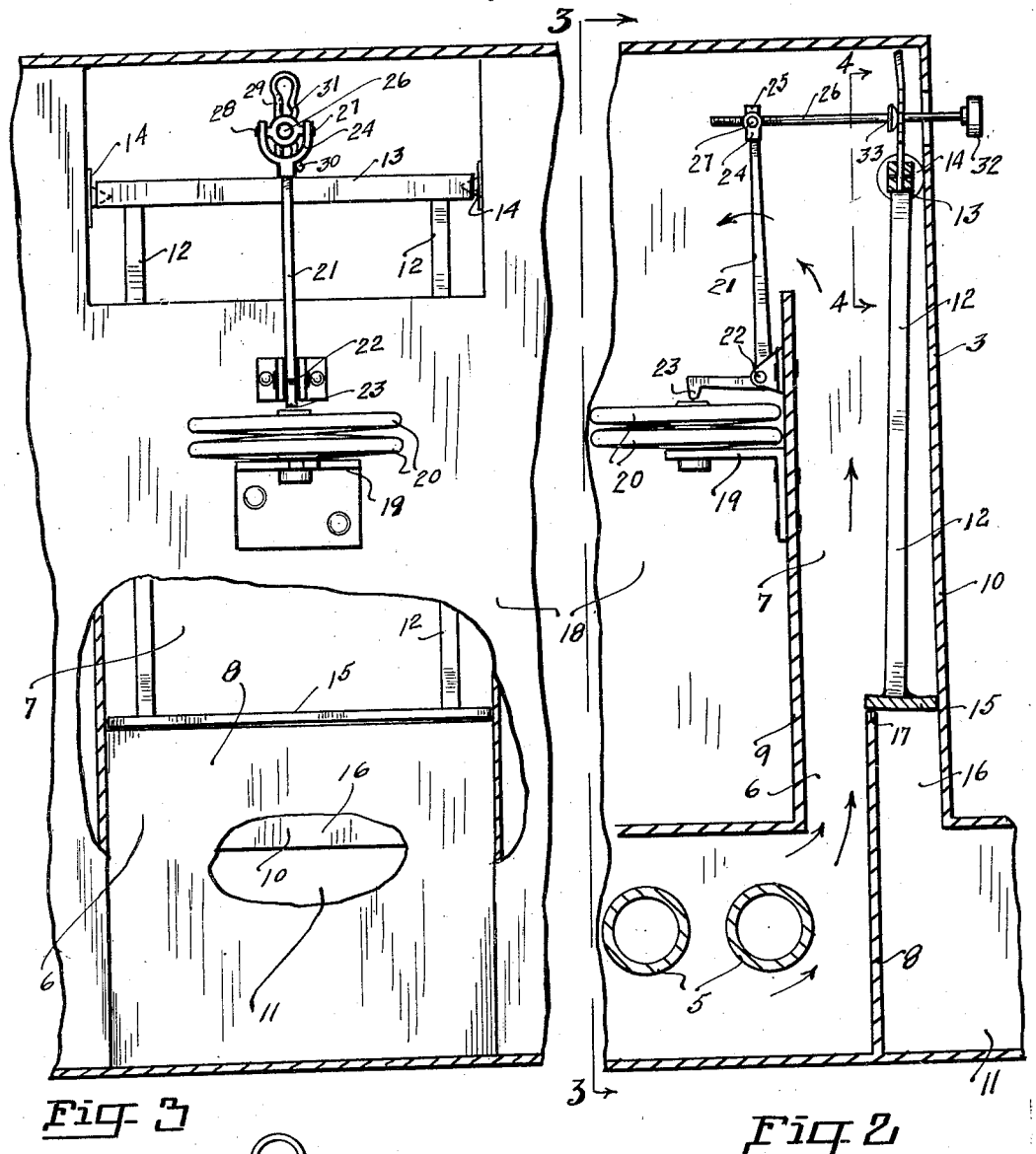
Fig. 2 is a sectional, side elevation of the assembled device, the same being taken on line 2—2 of Fig. 1, looking in the direction indicated.
Fig. 3 is a fragmentary, sectional, front view of the damper control element and of the diaphragm partitioning the air transfer well into more than one compartment.
Figure 4:
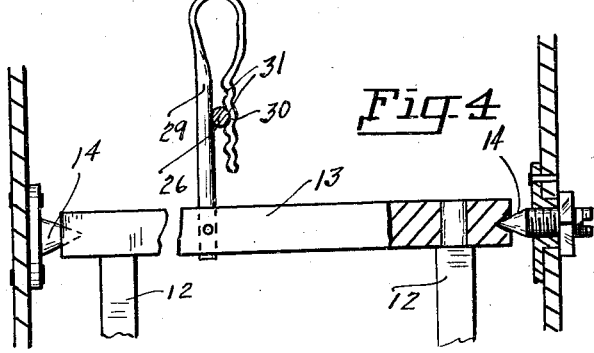
Fig. 4 is a side elevation, partially in section of the pendulum support and illustrating means for supporting the manually adjustable control shaft, the same being taken on line 4—4 of Fig. 2, looking in the direction indicated.

I have shown my device as being installed upon a brooder 1 which is divided into two separate and distinct compartments by a wall 2 disposed between the end sections of the brooder. My device in its preferred embodiment consists in a vertical housing member 3 and a horizontal portion 4. The horizontal portion 4 is adapted for the admission of normal uncooled air into the transfer chamber. One or more heating coils 5 are disposed horizontally within the base of the brooder and extend past the inlet passageway 6 that upwardly extends through the air transfer well 7. The air transfer well 7 is divided by a partition 8 that is disposed between the walls 9 and 10 forming the upper portion of the air transfer well. The end 11 admits normal air into the transfer well 7 from the exterior of the device. Pendulum bars 12 depend from the pendulum support 13 that is horizontally and pivotally disposed within the air transfer well. The same is supported about supporting points 14 which are so made as to reduce the frictional resistance to a minimum. A damper 15 is disposed at the lower end of the pendulum bars and is of a sufficient width to close either of the passageways 6 and 16, or to partially close each of the same. The damper and the pendulum bar is so arranged that the same rests normally, with the edge of the damper bar in engagement with the inner side wall 10 of the air transfer well and the lower side of the same in slightly spaced relationship with the upper edge 17 of the dividing wall 8, so that normal air is precluded from entering the chamber 18 in which the temperature is to be regulated. A bracket 19 inwardly extends from the wall 9 and one or more thermostat wafers 20 rest upon the bracket. A bell crank 21 is pivotally supported about a supporting pin 22 with the point 23 disposed upon one arm of the bell crank resting upon and disposed central of the upper one of the thermostat wafers 20. The upper end 24 of the bell crank is bifurcated and is hingedly secured to a head 25. The head 25 is threadedly engaged upon the actuating shaft 26. The head 25 has shafts 27 and 28 disposed at oppositely disposed sides of the same that are adapted to engage with the yoke 24. A supporting yoke 29 upwardly extends from the pendulum support bar 13 and a return end 30 terminates the yoke. Corrugations 31 are disposed upon the inner surface of the return end 30 and the actuating shaft 26 extends through the spaced portions of the yoke and is held in position by the corrugations disposed therein. The placing of the actuating shaft at different distances from the pendulum support bar predetermines the amount of movement of the damper relative to the movement of the thermostat wafers and therefore affects the sensitiveness of the manipulation of the damper. The adjustment of the head 25 upon the actuating shaft predetermines the position of the point 23 relative to the thermostat wafers. I have therefore provided two independent adjusting means for regulating the amount of movement and the sensitiveness of the damper 15 within the dualed air passageway. The shaft 26 may be manipulated by a thumb wheel 32. A collar 33, disposed upon the actuating shaft, maintains the shaft in position relative to that of the yoke 29. The adjusting of the point 23 is accomplished by the threading, or unthreading, of the actuating shaft 26 through the head 25. When the damper 15 is in the position as illustrated in Fig. 2, warm air only flows through the air well. When the damper is in the position as illustrated in Fig. 5, tempered air will flow through the air well by warmed air and normal air both being admitted into the air transfer well. Whereas when the damper is in the position as illustrated in Fig. 6 normal air only is permitted to flow through the air well into the room in which the temperature is to be regulated.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claim which follows.

What I claim is:

A heat regulating device for incubators and the like comprising an air transfer well, supporting pins disposed at the oppositely disposed sides of the upper portion of the well, one of said pins being adapted for adjustment, a pendulum support rockably disposed between the two pins, a pair of pendulum bars depending from the support, a damper disposed at right angles upon the free end of the bars, a supporting yoke one side of which is corrugated upwardly extending from the pendulum support, a thermostat mounted on one side of the air transfer well, a bell crank rockably secured to the same side of the well and having one of its ends in direct alignment with the top center of the thermostat, and the other of its ends being bifurcated, a threaded head rotatably disposed within the bifurcated end, and a shaft threadedly disposed within the head and yoke, said shaft adapted to being vertically moved relative to the yoke in order to predetermine the sensitiveness of the mechanism in toto.

MOSES J. ROTHROCK.